(12) United States Patent
Ignatyev

(10) Patent No.: US 10,614,056 B2
(45) Date of Patent: Apr. 7, 2020

(54) SYSTEM AND METHOD FOR AUTOMATED DETECTION OF INCORRECT DATA

(71) Applicant: NetSuite Inc., San Mateo, CA (US)

(72) Inventor: Oleksiy Ignatyev, Belmont, CA (US)

(73) Assignee: NetSuite Inc., San Mateo, CA (US)

( * ) Notice: Subject to any disclaimer, the term of this patent is extended or adjusted under 35 U.S.C. 154(b) by 854 days.

(21) Appl. No.: 15/071,063

(22) Filed: Mar. 15, 2016

(65) Prior Publication Data

US 2017/0236060 A1 Aug. 17, 2017

Related U.S. Application Data

(60) Provisional application No. 62/137,398, filed on Mar. 24, 2015.

(51) Int. Cl.
G06F 16/23 (2019.01)
G06F 16/215 (2019.01)
G06N 5/00 (2006.01)
G06N 20/00 (2019.01)

(52) U.S. Cl.
CPC ........ *G06F 16/2365* (2019.01); *G06F 16/215* (2019.01); *G06N 5/003* (2013.01); *G06N 20/00* (2019.01)

(58) Field of Classification Search
CPC .............. G06N 5/02; G06F 17/30303; G06F 17/30371; G06F 16/2365; G06F 16/215
USPC .......................................................... 706/46
See application file for complete search history.

(56) References Cited

U.S. PATENT DOCUMENTS

| 6,035,295 | A | * | 3/2000 | Klein | G06F 11/1612 |
| 7,844,641 | B1 | * | 11/2010 | Sengupta | G06Q 40/00 |
| | | | | | 707/806 |
| 9,390,121 | B2 | * | 7/2016 | Sengupta | G06Q 10/06 |
| 9,529,851 | B1 | * | 12/2016 | Smith | G06F 21/602 |
| 9,733,921 | B1 | | 8/2017 | Saenz et al. | |
| 9,817,991 | B2 | | 11/2017 | Boncha et al. | |
| 9,892,467 | B2 | | 2/2018 | Shak et al. | |
| 2005/0234969 | A1 | * | 10/2005 | Mamou | G06F 17/30563 |
| 2011/0251874 | A1 | * | 10/2011 | Banthia | G06Q 30/02 |
| | | | | | 705/7.31 |
| 2014/0032506 | A1 | * | 1/2014 | Hoey | G06F 17/30303 |
| | | | | | 707/691 |
| 2014/0067371 | A1 | * | 3/2014 | Liensberger | G06F 17/24 |
| | | | | | 704/9 |
| 2014/0222722 | A1 | * | 8/2014 | Varma | G06N 20/00 |
| | | | | | 706/12 |
| 2014/0278755 | A1 | * | 9/2014 | Eberl | G06Q 30/0201 |
| | | | | | 705/7.29 |

(Continued)

OTHER PUBLICATIONS

Hellerstein, Joseph M. "Quantitative Data Cleaning for Large Databases" Feb. 27, 2008 UC Berkeley EECS Computer Science Division. (Year: 2008).*

*Primary Examiner* — Vincent Gonzales
*Assistant Examiner* — Chase P. Hinckley
(74) *Attorney, Agent, or Firm* — Kraguljac Law Group, LLC

(57) ABSTRACT

Systems, apparatuses, and methods for the automated detection of incorrect data during a data entry process or detecting incorrect data that has been entered and stored previously. In one embodiment, the invention utilizes one or more of statistical analysis or a machine learning technique (either supervised or unsupervised) in order to identify potentially incorrect data.

16 Claims, 5 Drawing Sheets

(56) References Cited

U.S. PATENT DOCUMENTS

| | | | | |
|---|---|---|---|---|
| 2015/0012501 A1* | 1/2015 | Xing | .................... | G06F 16/215 |
| | | | | 707/690 |
| 2015/0066987 A1* | 3/2015 | Nelke | .................... | G06F 16/21 |
| | | | | 707/781 |
| 2015/0067486 A1* | 3/2015 | Hochman | ............. | G06F 17/273 |
| | | | | 715/257 |
| 2015/0310055 A1* | 10/2015 | Derstadt | ............. | G06F 16/2365 |
| | | | | 707/687 |
| 2015/0370848 A1* | 12/2015 | Yach | .................... | G06F 16/2365 |
| | | | | 707/694 |
| 2016/0094393 A1* | 3/2016 | Kaneko | .................... | G06F 16/22 |
| | | | | 709/220 |
| 2016/0110351 A1* | 4/2016 | Studer | .................... | G06F 16/214 |
| | | | | 707/752 |
| 2016/0343080 A1* | 11/2016 | Weng | .................... | G06Q 40/06 |
| 2017/0091168 A1* | 3/2017 | Bellegarda | ............. | G06F 17/276 |
| 2017/0236152 A1 | 8/2017 | Dimaunahan et al. | | |
| 2017/0236182 A1 | 8/2017 | Ignatyev | | |

* cited by examiner

SYSTEM AND METHOD FOR AUTOMATED DETECTION OF INCORRECT DATA

CROSS REFERENCE TO RELATED APPLICATION

This application claims the benefit of U.S. Provisional Application No. 62/137,398, entitled "System and Method for Automated Detection of Incorrect Data," filed Mar. 24, 2015, which is incorporated by reference herein in its entirety (including the Appendix) for all purposes.

BACKGROUND

Data entry and processing are important aspects of many systems, devices, processes, and applications. The results of data processing operations are essential to operating a business, implementing a policy, and making decisions. Because of the reliance by so many entities on the results of data processing operations, it is necessary that those results be an accurate representation of the associated system, device, process, or application. By inference, this means that the data upon which the data processing operations act must be correct. Incorrect data can present a problem in many data processing situations, as errors in data entry can be propagated into errors in the output of data processing operations, and eventually into decisions based on faulty information.

As a result of the importance of using accurate input data, the problem arises of how to ensure that correct data is used in data processing environments and applications. Conventional approaches to ensuring or at least increasing the likelihood of using correct input data typically involve proposing a word or data based on partially entered information (such as found in completion methods for data fields, entry of search terms, etc.), or in proposing corrections to an entered word or data based on performing a similarity comparison with a dictionary or set of known correct data. Further, conventional approaches are typically implemented in a manner that does not utilize user input or include a feedback mechanism for correcting potentially incorrect data, and are instead limited to enabling a user to select a choice from a set of choices that are presented. In general, while useful, conventional approaches are inherently limited, as they typically must rely on a previously assembled set of known correct data and an effective similarity measure. While this is often satisfactory when dealing with words, it is not nearly as useful when the entered data is unstructured or includes numbers or symbols that are not used to form words. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for the automated detection of incorrect data during a data entry process or detecting incorrect data that has been entered and stored previously. In one embodiment, the invention utilizes one or more of statistical analysis or a machine learning technique (either supervised or unsupervised) in order to identify potentially incorrect data. This may involve one or more of determining "patterns" of data entry that indicate a strong correlation between two items of data, learning a relationship between two pieces of data that suggest the pieces typically are entered together, identifying potential values of data that are "outliers", etc. Depending on values for one or more thresholds or limits (such as how "close" the data value is to historical and known correct data), the likelihood that a piece of data being evaluated is incorrect is determined. If this likelihood is above some threshold value, then a user performing data entry or a system administrator may be notified by means of a message, alert, notification, etc. The user or administrator may then either confirm the correctness of the data or revise the data in question. In some embodiments, one or more of the thresholds or limits may depend on the user's previous data entry accuracy, or may be determined through construction of a model or application of a machine learning technique to evaluate some aspect of the user (or user's peers) data entry accuracy for data in general (or for a specific type or format of data). In some embodiments, one or more of the thresholds or limits may depend on real-time or pseudo real-time values of data associated with an account on a multi-tenant platform or other form of data processing system for business related data or other source of data.

In one embodiment, the invention is directed to a method for detecting and correcting incorrect data being entered into a system, where the method includes:
  determining a category or type of data being entered into a system by a user;
  based on the determined category or type of data, automatically selecting an appropriate data analysis technique for use in evaluating the data being entered;
  accessing historical information regarding the data entry accuracy of the user, wherein the historical information is indicative of the user's accuracy with regards to data entry for the category or type of data being entered;
  based on the selected data analysis technique and the historical information for the user, automatically determining the likelihood that the data being entered is incorrect;
  using the determined likelihood that the data being entered is incorrect as part of a decision process to decide whether the data should be accepted into the system, where the decision process may depend upon one or more limits, rules, conditions, triggers, or threshold values;
  if the result of the decision process indicates that the data should be accepted into the system, then storing the data within the system;
  if the result of the decision process indicates that the data should not be accepted into the system, then requesting that the user review the data and determine whether it is correct or not, and if the data is incorrect, to provide a correction to the data; and receiving a response from the user, and either accepting the data into the system, or accepting a revised or corrected version of the data into the system.

In another embodiment, the invention is directed to a multi-tenant data processing system, where the system includes:
one or more business related data processing applications installed in the system and accessible by a plurality of tenants of the multi-tenant data processing system;
a data storage element accessible by a plurality of tenants of the multi-tenant data processing system;
a processor programmed with a set of instructions, wherein when executed by the processor, the instructions cause the system to
determine a category or type of data being entered into the system by a user;
based on the determined category or type of data, automatically select an appropriate data analysis technique for use in evaluating the data being entered;
access historical information regarding the data entry accuracy of the user, wherein the historical information is indicative of the user's accuracy with regards to data entry for the category or type of data being entered;
based on the selected data analysis technique and the historical information for the user, automatically determine the likelihood that the data being entered is incorrect;
use the determined likelihood that the data being entered is incorrect as part of a decision process to decide whether the data should be accepted into the system, where the decision process may depend upon one or more limits, rules, conditions, triggers, or threshold values;
if the result of the decision process indicates that the data should be accepted into the system, then storing the data within the system;
if the result of the decision process indicates that the data should not be accepted into the system, then requesting that the user review the data and determine whether it is correct or not, and if the data is incorrect, to provide a correction to the data; and
receive a response from the user, and either accepting the data into the system, or accepting a revised or corrected version of the data into the system.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
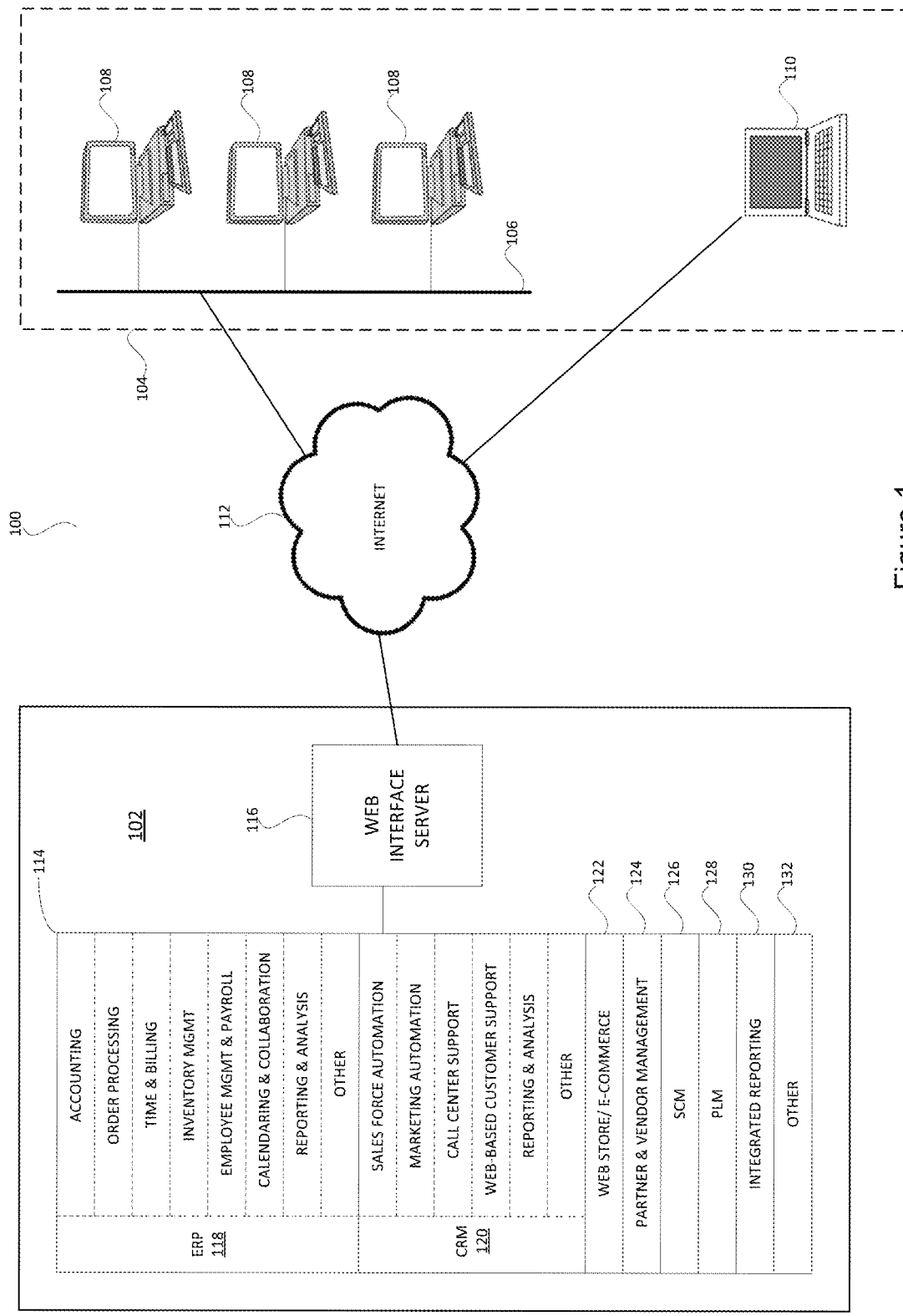
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for automated detection and in some cases correction of incorrect data. The data may be entered by a user (in which case the detection and/or correction may occur in real-time, pseudo real-time, or post data entry), or the evaluated data may have been entered previously and stored in a suitable data storage element.

In one embodiment, the invention utilizes one or more of statistical analysis or a machine learning technique (supervised or unsupervised) in order to identify potentially incorrect data. This may involve determining "patterns" of data entry that indicate a strong correlation between two items of data, learning a relationship between two pieces of data that suggest the pieces typically are entered together, identifying potential values of data that are "outliers", etc. Depending on values for one or more thresholds or limits (such as how "close" the data value is to historical and known correct data), the likelihood that a piece of data being evaluated is incorrect is determined. If this likelihood is above some threshold (which may be predetermined or dynamically set, and based on one or more relevant factors, such as the user, the type of data, historical values for the type of data, current values for the type of data, etc.), then a user performing data entry or a system administrator may be notified by means of a message, alert, notification, etc. The user or administrator may then either confirm the correctness of the data or revise the data in question.

In some embodiments, one or more of the thresholds or limits may depend on the user's previous data entry accuracy. The user's historical accuracy with regards to data entry may be used to modify a limit or trigger so that if the user is typically more accurate than average (or is a sufficient number of standard deviations from average) when entering data, then the inventive system and processes may adjust the limits or triggers to take into account that the user is more likely to be correct, even though the element of data in question may appear to be incorrect or at least open to question. In some embodiments, one or more of the thresholds or limits may be determined through construction of a model or application of a machine learning technique to evaluate some aspect of the user (or user's peers) data entry accuracy for data in general (or for a specific type or format of data). In some embodiments, one or more of the thresholds or limits may depend (in whole or in part) on real-time or pseudo real-time values of data associated with an account on a multi-tenant platform or other form of data processing system. In these embodiments, data formats and values from the output of a business data processing application (such as an ERP or CRM application) may be used to modify a limit or trigger value so that the limit or trigger takes into account a realistic range of possible data types or values (which may, for example, depend on actual operating characteristics of a business or process, and which may vary over time). This allows the inventive system and processes to adapt or accommodate to changes over time in the type or the qualities of data that a business generates or interacts with from other sources.

In some embodiments, the invention may be implemented in the context of a multi-tenant, "cloud" based environment (such as a multi-tenant business data processing platform), typically used to develop and provide web services and business applications for end users. This exemplary implementation environment will be described with reference to FIGS. 1-3, which illustrate example architecture(s) or environment(s) in which an embodiment of the invention may be implemented. Note that embodiments of the invention may also be implemented in the context of other computing or operational environments or systems, such as for an individual business data processing system, a private network used with a plurality of client terminals, a remote or on-site data processing system, another form of client-server architecture, etc. In general, an embodiment of the inventive systems and methods may be implemented in the context of any data processing environment or architecture in which the accuracy of entered or stored data is essential and may be difficult to determine, whether due to concerns related to timeliness, volume of data, complexity of data, the variety of data sources or types, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to support one or more software services or applications intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
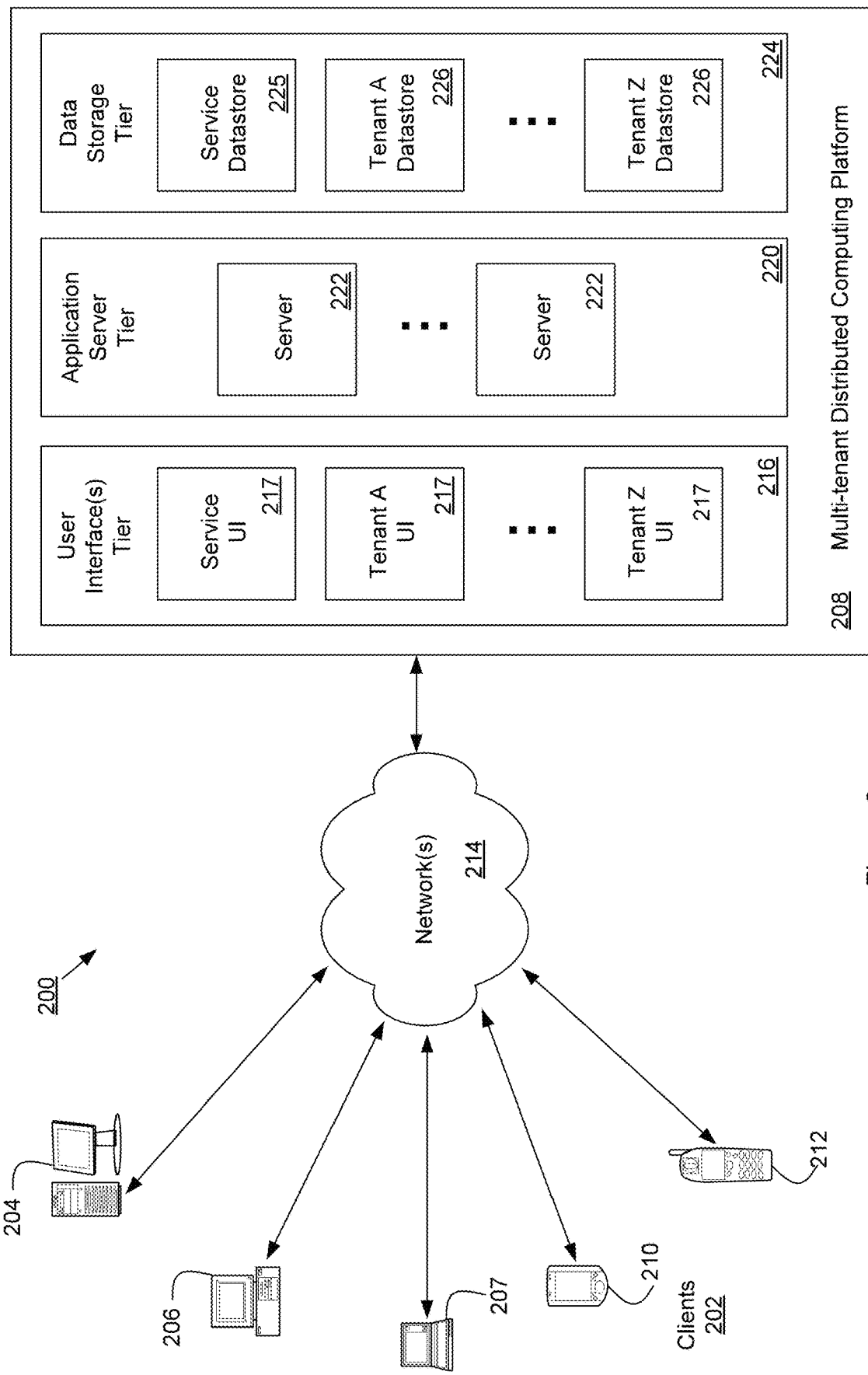
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or system administrator to configure/administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to support one or more software services or applications intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 3:
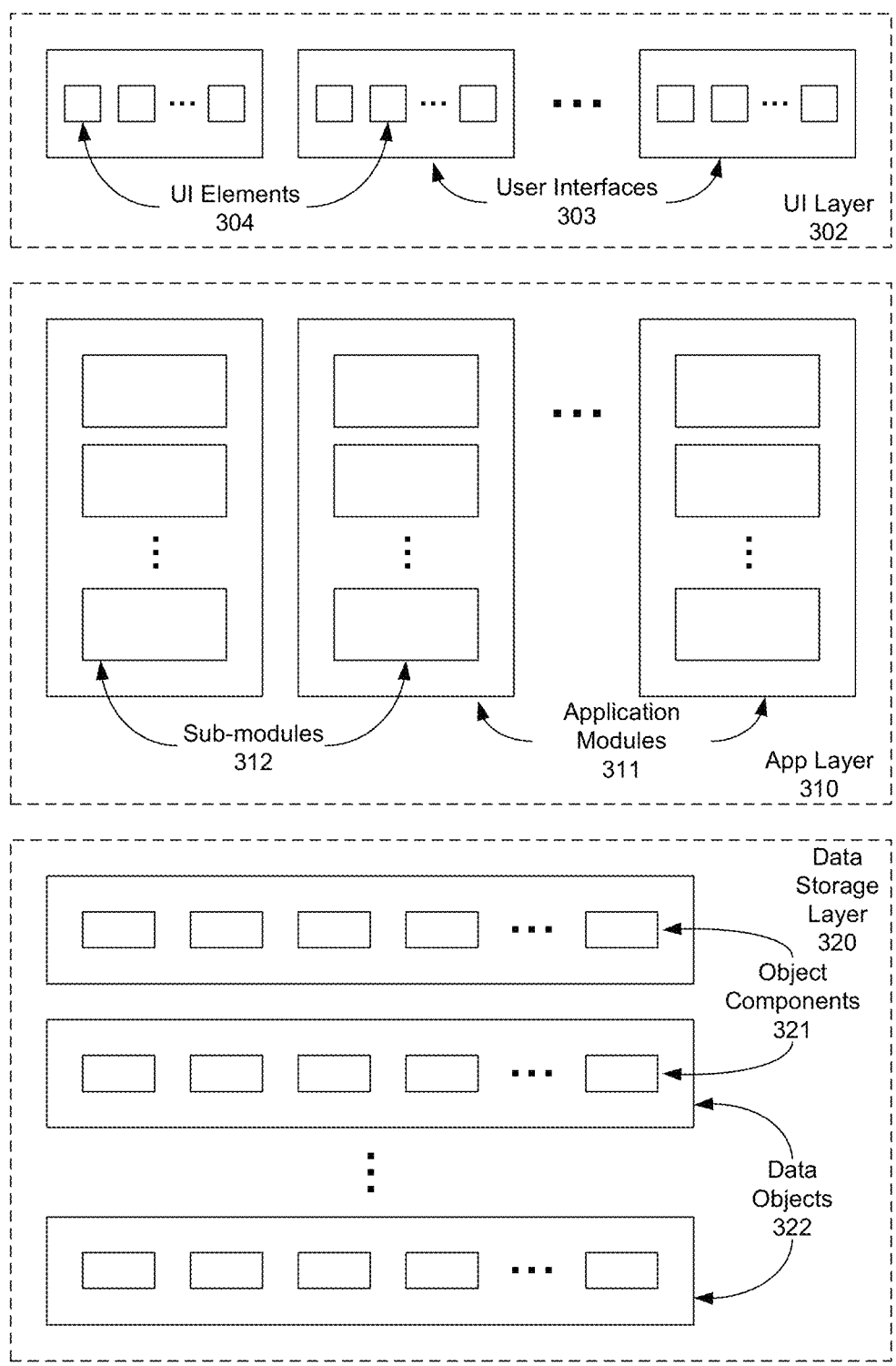
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

Identifying (and/or accepting a user input indicating) a category or type of data being entered into the system or being evaluated after having been entered and stored (note that this can serve to expedite evaluation by directing the inventive system and processes to more relevant information about the data, users, data formats, expected ranges, historical values and variation, currently expected values and variation, etc.);

Based on the identified category (or independently), determining an appropriate algorithm, heuristic, or other form of data analysis technique applicable for determining if the data being entered or evaluated is incorrect—this determination of the appropriate algorithm, etc. may be based on previously learned information or on information entered by the user (and/or selected from a set of offered options), and may include one or more of statistical analysis techniques, application of an error detection model, application of a curve or function fitting model, application of a machine learning technique to identify one or more relevant factors, setting of a threshold, etc.;

If desired (typically in accordance with the preferences of a system administrator or tenant account manager), accessing historical data entry information regarding a user, where the historical information is indicative of the user's accuracy with regards to data entry (where the accuracy may be represented as a function of one or more user or data related factors, such as the user's experience level or the category, type and/or format of the data being considered);

Based on the selected/determined algorithm, heuristic, or other form of data analysis technique and (if desired) the historical data entry information for the user, determining/estimating the likelihood that the data being entered by the user (or that was previously entered and is now being evaluated) is incorrect;

If the likelihood that the data being entered or evaluated is incorrect exceeds a specified or determined threshold value, then generating an alert/message/notification to the user or to a system administrator requesting that they review the data and determine whether it is correct or not;

Receiving a response from the user or system administrator to the alert/message/notification and in response, accepting the data or accepting a revised or corrected element of data into the system; and Retraining the system based on the presumed correct or revised/corrected data (e.g., updating the dataset by adding to it either unchanged data (i.e., data that is verified to be correct) or revised/corrected data provided by the user or system administrator). The system then uses the revised/updated dataset in order to optimize (potentially modify) the parameters of the implemented algorithm/heuristic/methodology.

Note that the characteristics of the data being entered and/or evaluated after previous entry may impact the most effective or useful analysis method(s) for use in determining/ identifying incorrect data; for example:

although in some cases the specific application from which the data is derived (e.g., CRM, ERP, eCommerce, HR, financial) may be used to identify the most suitable technique or analysis tool for determining incorrect data, typically, examination or evaluation of the data itself is needed to determine which algorithm or methodology is most applicable;

For example, one could select a training sample of 1000 records from one or more data processing applications (e.g., CRM, ERP, eCommerce, etc.). The selected data may be subjected to a manual verification process (by asking the people who entered those records to carefully review their previous entries and mark any incorrect ones) to clarify which data records were correct and which were not correct for each training data sample. Then the system could apply one or more different possible algorithms, heuristics, or techniques (such as machine learning) in order to identify the best performing detection algorithms for each specific data sample, and its corresponding application (CRM, ERP, eCommerce, etc.). Based on that information, in the future, the system would use the "best" performing algorithm for each specific application (until a more optimal method or approach was identified);

In order to identify the "best" algorithm/method, a suitable algorithm/method performance metric may be defined. For example, the following metric may be used:

accuracy=(ΣTrue positive+ΣTrue negative)/(ΣTotal population), where, "True positive" prediction is when a data point was incorrect, and the algorithm/method predicts it to be incorrect, and "True negative" prediction is when a data point was a correct one and the algorithm/method predicts it to be correct as well. "Σ Total population" represents total number of data records against which predictions have been made. Thus in the above example, "Σ Total population"=1000. The algorithm or methodology having the highest accuracy metric among other algorithms/methods would be the "best" one for each corresponding application or data type (CRM, ERP, eCommerce, etc.).

The above example may be modified in order to avoid a manual data verification process and also to increase the sample size of the data used for algorithm training. Instead of selecting a finite set of records (e.g., the 1000 referred to), one could evaluate an entire data set with corresponding data fields that was saved in the database within a certain time period (e.g., no later than 2 years ago, but also no earlier than 1 year ago). With this approach, the method would consider all data points entered during a 1-year period. These could be substantially more than the 1000 data points used in the previous example.

For example, in one implementation, denote the selected data set as $DS_1$. Then the inventive method takes into consideration (using historical data logs) any data changes that occurred for any data point from $DS_1$ up to the current time. Using this approach, any data point from $DS_1$ would have at least a 1-year time period (and at most 2 years) to be corrected by a user/administrator in the situation where that data point was incorrect.

After the method determines the corrected data points from $DS_1$, it then creates a new (originally empty) data set $DS_2$ to which it adds incorrect values of corrected data points from $DS_1$ to $DS_2$, and identifies those data points as "incorrect". In addition, the corrected values of the corrected data points from $DS_1$ to $DS_2$ are added and those data points are identified as "correct". Further, all other data points from $DS_1$ to $DS_2$ which have never been corrected by a user/administrator are also added and identified as "correct" data, since there is no indication that those data points were incorrect ones (i.e., at least one year has passed, and no one has corrected them).

Next, the data set $DS_2$ is used to train and evaluate the performance of the machine learning, statistical, algorithmic, or other data analysis methodology. The best" performing methodology is then selected. As in the previous example, note that $DS_2$ could contain records from one or more data processing applications (e.g., CRM, ERP, eCommerce, etc.). In such a situation, a different algorithm or methodology could be the "best" for different data processing applications, data types or combinations of applications or data types.

Below is a table illustrating the possible performance of some of the algorithms/methodologies described herein as applied to data sets from specific data processing applications (e.g., CRM, ERP, eCommerce, etc.). The values in the table represent examples of the accuracy metric that might be generated for each algorithm/method tested against a data set associated with the indicated applications (e.g., CRM, ERP, eCommerce, etc.).

| Algorithm/method | CRM data | ERP data | eCommerce data |
| --- | --- | --- | --- |
| Regression based method or GLM based method | 0.8 | 0.82 | 0.95 |
| Methods Based on Detection of Data Outliers | 0.92 | 0.85 | 0.78 |
| Unsupervised machine learning algorithm | 0.84 | 0.93 | 0.8 |
| Supervised machine learning algorithm | 0.87 | 0.97 | 0.86 |

Given the example (fictitious) data in the table, it is observed that the "best" performing algorithm for CRM application data is a method based on detection of data outliers (with an accuracy of 0.92), for ERP application data the "best" performing algorithm is a supervised machine learning algorithm (with an accuracy 0.97), and for eCommerce application data the "best" performing algorithm is a regression based method or GLM based method (with accuracy of 0.95).

Note that based on the characteristics of the data being considered (ERP, CRM, eCommerce, etc.), it would not be unexpected for certain types of algorithms or analysis techniques to be found to be preferable or more reliable. For example, it would not be surprising that a regression based method might be the best performing for eCommerce application data. This is because there are many highly correlated numerical data fields in an eCommerce application, and hence a regression based method would be expected to perform well. For CRM application data one expects many numerical data values (but that are not relatively highly correlated) and not so many categorical data fields, which would lead one to expect that a method based on detection of data outliers would work best for that type of data or application. For ERP application data one expects many categorical data fields with sparse data and not as many numerical data fields, which would lead one to expect that a supervised machine learning algorithm would work best for that type of data or application.

Note also that the methodology described above regarding generating a set of sample, training or test data and selection of a "best" or optimal algorithm to use for data processing purposes may be utilized for different types of data, different sources of data, different data processing application formats, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module.

Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing or data processing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed directly or remotely over a network. Further example environments in which an embodiment of the invention may be implemented include devices (including mobile devices), software applications, systems, apparatuses, networks, or other configurable components that may be used by multiple users for data entry, data processing, application execution, data review, etc., and which are coupled to data storage and data processing systems. Although further examples below may reference the example computing environment depicted in FIGS. 1-3, it will be apparent to one of skill in the art that the examples may be adapted for alternate computing devices, systems, apparatuses, processes, data storage devices, and data processing environments. Note that an embodiment of the inventive methods may be implemented in the form of an application, a sub-routine that is part of a larger application, a "plug-in", an extension to the functionality of a data processing system or platform, or any other suitable form.

Figure 4:
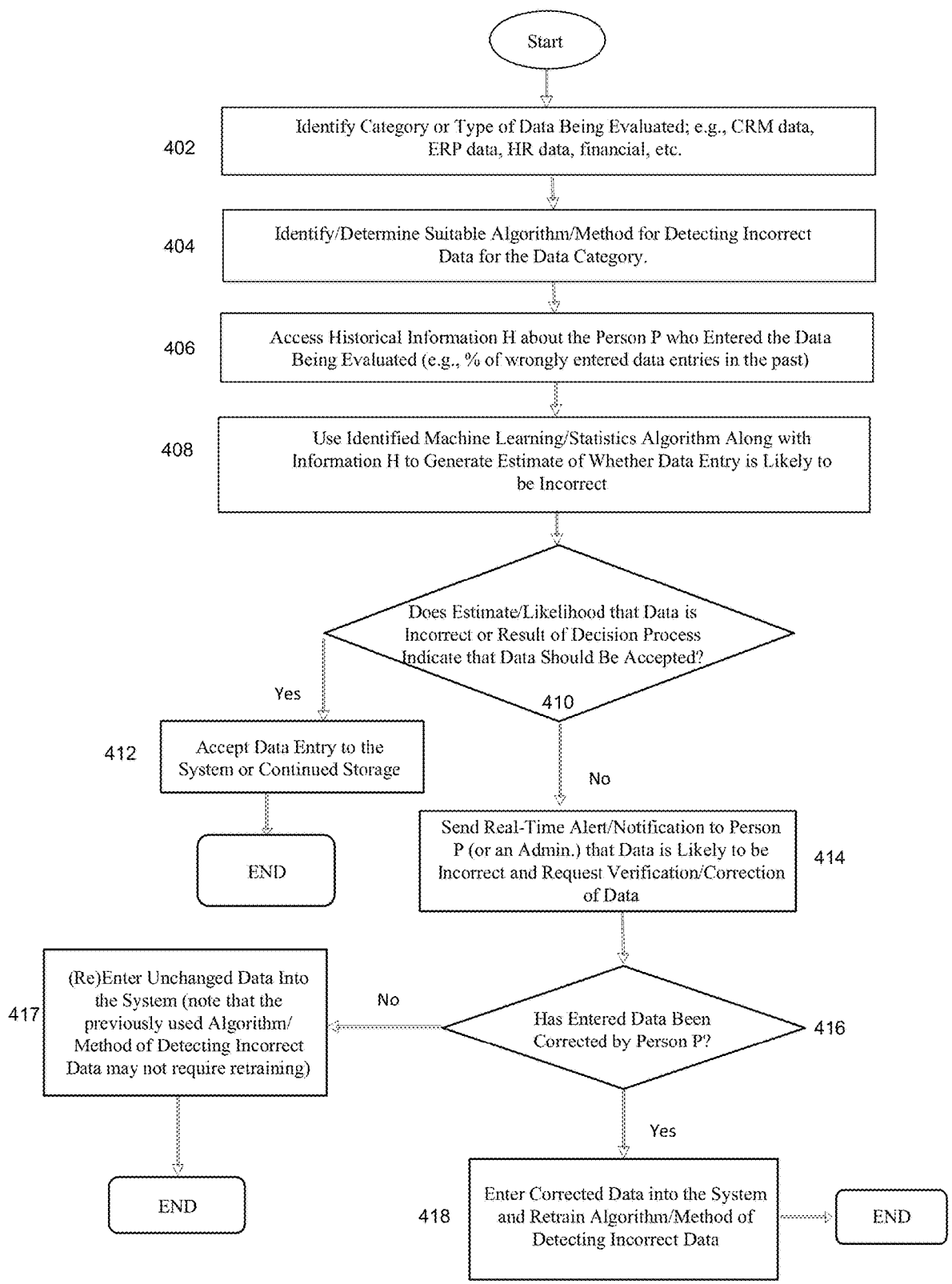
FIG. 4 is a flow chart or flow diagram illustrating a process, method, operation, or function for automated detection of incorrect data, and that may be used when implementing an embodiment of the invention.

FIG. 4 is a flow chart or flow diagram illustrating a process, method, operation, or function for automated detection of incorrect data, and that may be used when implementing an embodiment of the invention. In some embodiments, a module or routine that performs some or all of the aspects of the inventive process, method, operation, or function illustrated in FIG. 4 may be implemented in the form of a set of software instructions that are designed to be executed by a suitably programmed processing element (such as a CPU, microprocessor, processor, controller, computing device, etc.). As shown in the figure, in some embodiments an implementation of the inventive process, method, operation, or function may include the steps or stages of:

Identifying or determining a category or type of data being entered into the system or being evaluated after having previously been entered and stored (as suggested by step or stage 402, where this identification/determination may be performed by means of a user input, detection of a characteristic of the category or type of data, a semi- or fully automated discovery process, etc.);

Based on the identified/determined category, determining an appropriate algorithm, heuristic, or other form of data analysis technique applicable for use in determining if the data being entered or evaluated is incorrect (step or stage 404, where such technique may include one or more of statistical analysis, data outlier identification, pattern identification, application of a machine learning technique or other form of modeling, and may depend in whole or in part on a user input or a characteristic of the category, a generated recommendation, etc.);

If desired, accessing historical information regarding the data entry accuracy of a user or set of users (such as those who have entered similar data or performed a similar task), where the information is indicative of the user's or set of users' prior accuracy with regards to data entry or data entry for the type of data being considered (step or stage 406);

Based on the selected algorithm, heuristic, or other form of data analysis technique and (if desired) the historical data entry information for the user or set of users, determining/estimating the likelihood that the data being entered or evaluated (after prior entry) is incorrect (step or stage 408);

Comparing the determined/estimated likelihood that the data being entered or evaluated is incorrect to a specific value or using the determined/estimated likelihood as part of a decision process, where the decision process may depend upon one or more limits, rules, conditions, triggers, threshold values, etc. (step or stage 410);
  where the specific value or the limits, rules, conditions, triggers, or threshold values may depend on (or be a function of) the user, the account, the user's or users' historical data entry accuracy information, or historical, real-time or pseudo real-time business data associated with the account (such as ERP, CRM, eCommerce, HR, or financial data);

If the likelihood that the data being entered or evaluated is incorrect or the result of the decision process indicates that the data should be accepted for entry or retained in the data storage system (as suggested by the "Yes" branch of step or stage 410), then storing (or restoring) the data, as suggested by step or stage 412;

If the likelihood that the data being entered or evaluated is incorrect or the result of the decision process indicates that the data should not be entered or retained in the data storage (as suggested by the "No" branch of step or stage 410), then generating an alert/message/notification to the user or to a system administrator requesting that they review the data and determine whether it is correct or not, and if incorrect, correct the data (as suggested by step or stage 414);

Receiving a response/message/indication from the user or system administrator, and in response, accepting the data (because the user or system administrator confirmed the correctness of the data in question, corresponding to the "No" branch of step or stage 416), or accepting a revised or corrected element of data into the system (because the user or system administrator has revised the data in question, corresponding to the "Yes" branch of step or stage 416); and If indicated, retraining the system (i.e., re-evaluating the statistical or machine learning based analysis of the system data) based on including the revised/corrected data (step or stage 418) and removing the incorrect data. Typically, as used herein, "retraining" refers to a process by which a dataset is updated or revised by adding to it either unchanged data (e.g., that data which is verified to be correct by the user or system administrator), or data that has been revised/corrected by the user or system administrator. After that, the updated dataset is used in order to optimize (e.g., potentially modify) the parameters of the algorithm/method being used to identify incorrect data.

As described herein, embodiments of the inventive system and methods may be used to "predict" or identify data that may require correction, based on analyzing past historical data entered into the system/platform/server/cloud (which may have previously been confirmed to be clean and correct data). In some embodiments, the invention uses statistical and/or machine learning based methods in order to make such a prediction or identification. Note that as a result of the analysis of historical user entered and other data, the inventive system and methods is able to identify and learn existing data patterns, and hence is able to determine when newly entered and/or previously entered data points do not follow (or are inconsistent with) those discovered/learned patterns.

In some embodiments, potentially (or likely) incorrect data may be either "flagged" or removed from the data store. If data is flagged, then a corresponding error message/notification may be generated and displayed/sent to the person responsible for the data entry (and/or to a system or account administrator). This message/alert/notification would prompt the user or other person to confirm that either the identified data was entered correctly, or to correct the identified/flagged data and re-enter it into the system (as suggested by step or stage 414 of FIG. 4). The notification could be generated in near real-time (e.g., while the user is entering the data into the system), or it could be delivered later (for example by email). The notification may prompt the user to confirm that the data was correct, and if not, request that they correct the incorrect data (and in some cases may propose a correction to the incorrect data based on the results of an analysis or learning process that includes consideration of historical or current data values). If data entry was performed by a software application or automated process, then flagged data could be automatically removed from a data store until confirmation that the data was actually correct (or correction of that data had been verified).

As noted in steps or stages 404 and 408 of FIG. 4, embodiments of the inventive system and methods may utilize one or more specific data analysis or processing techniques to assist in identifying potentially incorrect data. The following sections describe certain aspects of these techniques and provide further details regarding implementation of the techniques and other aspects of embodiments of the inventive system and methods.

Data Translation/Conversion Techniques

In some embodiments, when possible and for ease of use, data entries may be translated into a numerical format. Thus, if the data entered was originally in numerical form, then it is kept in that form. However, if the data entered was in the form of a category, label, or identifier, then it may be converted or translated into a numerical format using the following approach (or another suitable process):

Assume a "categorical" data field has K different possible values. For example, categorical data field "Vertical" may have K=3 possible values: "Software", "Services", or "e-Commerce". In such a case, the system can represent that categorical data field as a K-dimensional vector, where all entries but one are equal to "0" and one entry equals "1", with the entry having a value of "1" corresponding to the specific categorical value;

Thus, in the above example, the system would generate the following numerical data format corresponding to each categorical data value: "Software" will correspond to a vector (1,0,0); "Services" will correspond to a vector (0,1,0); and "e-Commerce" will correspond to a vector (0,0,1). Each data entry will be transferred to a numerical vector format as the following example shows;

Assume, for example, that full data entry consists of 3 fields, where the 1st and 2nd fields are the numerical value fields "Annual Revenue" and "Number of employees", and the 3rd field is a categorical field "Vertical" (an example of which was discussed above). In such a case, the table below shows three original data entries and their corresponding numerical vector entries:

| Annual Revenue (in millions) | Number of employees | Vertical | Corresponding numerical vector entries |
|---|---|---|---|
| 8.2 | 22 | Software | (8.2, 22, 1, 0, 0) |
| 12.5 | 38 | e-Commerce | (12.5, 38, 0, 0, 1) |
| 30 | 47 | Services | (30, 47, 0, 1, 0) |

Based on this data format (or another suitable format), embodiments of the inventive system and methods may implement and utilize one or more of several techniques in order to identify potentially incorrect data. In some embodiments, the methods may identify "patterns" in existing data, and then identify data entries which are sufficiently different or "far away" enough from the identified patterns as the most likely to be incorrect (based on an applicable and relevant decision process). Examples of a method or technique that may be used, include, but are not limited to (or required to include) those described below:

Regression Based Methods (e.g., Generalized Linear Model (GLM))

In this type of method/technique, a linear and/or non-linear regression model or GLM may be used to identify and extract the patterns in the data. Assume that by analyzing past historical data of a system, platform, or enterprise, the inventive system and methods are able to determine that two data fields (X and Y) are "strongly correlated" (for example, the absolute value of correlation coefficient between X and Y is at least 0.7, or another value that is believed to be sufficient for the purposes of the modeling) and follow a linear regression model $$Y=a*X+b+z,$$

where "a" is the slope, and "b" is the Y-intercept, and are estimated parameters of the model, and z (an error term) is a normally distributed random variable.

Suppose that we have n different data points (Xi, Yi) (i=1 . . . , n) entered into the system. For each data point (Xi, Yi) (i=1 . . . , n), we calculate the residuals values $z_i$ in order to satisfy the equation. Further, suppose that for 95% of all previously observed data points (Xi, Yi), $|z_i|<5$, while for 99% of all previously observed data points (Xi, Yi), $|z_i|<10$.

Now, assume that the inventive system and methods determine that a new piece of data (Xk, Yk) is such that in order to satisfy the linear regression model Y=a*X+b+z, the value of $z=z_k$ would be equal to $z_k=30$, which is off of the interval $|z|<10$. In such a case or example, the inventive system "flags" this piece of data (Xk, Yk) as being potentially incorrect/invalid. In response, an alert/notification is generated and sent to the user who is entering data, advising them of the suspected error and requesting that they confirm whether the data (Xk, Yk) is correct (or if not, to enter the correct data). Note that depending on the application or use case, an alternative is to temporarily remove data entry (Xk, Yk) from the system/server/cloud until its correctness/validity can be confirmed.

As noted, in another possible function or operational aspect, the system may use historical information H regarding the user/person P entering the data into the system (or the person with who already entered data is associated). This information H could include, for example, a proportion of previously entered incorrect data entries by the person P. As an example, denote by $H_j$ the proportion of previously entered incorrect data entries by the person $P_j$.

As another possible function or operational aspect, the system may use historical information G regarding the tenure in the current role of the user/person P entering the data into the system. As an example, denote by $G_j$ the total tenure (e.g., measured in months) within the organization/company of the user/person P entering the data into the system (i.e., the person $P_j$).

As yet another possible function or operational aspect, the system may use data regarding the time of day that specific information was entered into the system. As an example, denote by $t_j$ a time of the day when information was added to the system by the person $P_j$.

Possible reason(s) for the significance of these parameters may be one or more of the following:
  it may be observed from the data that users with higher $H_j$ tend to enter more erroneous data points than people with lower $H_j$;
  it may be observed that users with lower $G_j$ tend to enter more erroneous data points than people with higher $G_j$; or
  it may be observed that users with higher $t_j$ tend to enter more erroneous data points than people with lower $t_j$.

Based on the available data and/or supporting information, in one embodiment the inventive system and methods use a decision-tree machine learning algorithm to identify whether a specific entered data point is likely to be erroneous. As inputs to this algorithm, in some embodiments, the method considers the following parameters for a data point $(X_j, Y_j)$ entered by a user $P_j$: 1) $|z_j|$; 2) $H_j$; 3) $G_j$; 4) $t_j$; and 5) the output for the model or algorithm indicating whether the data point was likely to be a correct one or an erroneous one.

One example of using the variables or factors mentioned ($|z_j|$, $H_j$, $G_j$, $t_j$, and the output of the model or algorithm) in an embodiment of the inventive system will now be described. In this example, the decision-tree algorithm may be trained on a training dataset of (for example) 5000 data points $(X_j, Y_j)$ having inputs $|z_j|$, $H_j$, $G_j$, and $t_j$, and an output of the model for each of the data points. The result of the trained decision-tree algorithm may be described using the following predictive model, which is intended to determine the likelihood (or relative likelihood), that a specific data point (Xm, Ym) is erroneous.

For each piece of data (Xm, Ym) entered into the system by person $P_j$, the output of a regression based method would be based on, or take into consideration, the following conditions (note that these constraints or threshold values are examples of possible constraints or conditions, and are not meant to suggest that these are the only types that may be used):

(i) If residual $|z_m|$ 95th percentile of $|z|$ (which is the absolute value of the previously observed residuals z of the linear regression model for all data points (Xi, Yi) (i=1 . . . , n)), then accept data entry into the system;

(ii) If residual $|z_m|$ 99th percentile of $|z|$ (which is the absolute value of the previously observed residuals z of the linear regression model), then alert/send notification to person $P_j$ to request a confirmation as to whether the data item (Xm, Ym) is correct;

(iii) If 95th percentile of $|z|<|z_m|<$99th percentile of $|z|$, and if $H_j \leq 0.02$, then accept data entry into the system; and (iv) If 95th percentile of $|z|<|z_m|<$99th percentile of $|z|$, and if ($H_j>0.02$ and $G_j<3$ months) or if ($H_j>0.02$ and $t_j>16$ hours), then alert/send notification to person $P_j$ to request a confirmation as to whether the data item (Xm, Ym) is correct; and (v) Otherwise accept data entry to the system.

Note further that in some embodiments, the value, limit, or threshold used in the decision process (such as the percentile limits used in the example) may be a function of other factors, such as the underlying business data or metrics. This permits the decision process to vary depending upon the state of the business operations or changes to the expected format or type of data being considered, among other factors.

If the result of applying conditions (i)-(iv) above is that some of the data entered has been modified/corrected, then the system updates the data entry with a corrected value, and repeats the relevant steps described herein; these may include re-calculating a correlation coefficient between different numerical variables X and Y, followed by fitting (if possible, i.e., if the absolute value of the correlation coefficient between X and Y is at least 0.7, or the set threshold value) the linear regression model with re-estimated values for the parameters a and b, and then re-training the decision-tree algorithm with potentially updated input values for one or more of $|z_j|$, $H_j$, $G_j$, $t_j$, or the output indicating whether a data point was likely to be a correct one or an erroneous one, followed by applying the newly trained decision-tree algorithm to new data entries (Xk,Yk).

Methods Based on Detection of Data Outliers

In this data analysis method, the system uses statistical methods to detect/identify data outliers in order to flag suspicious data items. Thus, if a data item is judged to be an outlier with respect to previously observed data points, then the system may "flag" it as potentially being incorrect/wrong. One implementation of this approach may use multi-dimensional data outlier detection methods (where the number of dimensions is equal to the length of the corresponding numerical vector entries), or instead may use a lower-dimensional data outlier detection method. In the following description, note that one-dimensional data outlier detection is discussed for purposes of simplicity, but that a similar approach/logic could be applied for purposes of application to multi-dimensional data or multi-dimensional methods.

Note that if desired or needed to provide sufficiently reliable results, the data can be filtered by category; this may be desirable because certain data fields may be restricted to specific associated categorical values and have different patterns, and a system operator may want to differentiate/identify those patterns independently of each other. As an example, after category based filtering, for each selected categorical value, the system may select corresponding values of "annual revenue" (as a first data set) and the "number of employees" value (as a second data set). The inventive system and methods may then be used to separately analyze the first and second data sets to identify potential outlier values.

For purposes of this example, consider the following formulas for the upper and lower "fences" used to detect outliers of a data set:

Denote $Q_1$ and $Q_3$ as the first and third quantiles (respectively) of the numerical data set under consideration. Denote IQR=$Q_3$−$Q_1$. Then define Upper fence=$Q_3$+$k$*IQR, Lower fence=$Q_1$−$k$*IQR, where k is a constant. For example, k could be equal to 1.5 (note that in conventional statistical analysis, k=1.5 and k=2 are the most often used constants for this type of analysis, with k=1.5 being more restrictive than k=2 for the purpose of outlier detection, and where k=3.0 is assumed to represent a least restrictive approach). Then, any data point which is either above the upper fence or below the lower fence would be considered an outlier value.

Next, denote by $H_j$ a proportion of previously entered incorrect data entries by the person $P_j$. As mentioned previously, another possible function or operational aspect may be to use historical information G about the tenure in a current role of the user/person P entering the data into the system. As an example, denote $G_j$ as the total tenure, measured in months, within the organization/company of the user/person $P_j$. As another possible function or operational aspect, the system may use the data about what time of the day the information was entered into the system. As an example, denote $t_j$ a time of the day when information was added to the system by the person $P_j$. Next, an embodiment of the invention uses a decision-tree machine learning algorithm to identify whether a specific entered data point $X_j$ was likely to be incorrect. As inputs to this algorithm consider the following parameters for any data point entered by the user $P_j$: 6) whether the data point $X_j$ is an outlier or not; 7) $H_j$; 8) $G_j$; 9) $t_j$, and the output for the algorithm/decision process specifying whether data point $X_j$ was a correct or erroneous. An example of using these inputs is described below. As an example, the decision-tree algorithm could be trained on a training dataset of 5000 or more data points $X_j$, each having the associated inputs noted above. The result of the trained decision-tree algorithm may be described in the following predictive model that determines whether a specific data point $X_m$ is likely to be incorrect.

In one embodiment, the inventive system may use the following steps in order to identify potentially incorrect data that was entered by a person $P_j$:

a) If data point $X_m$ is not an outlier, then accept data point $X_m$ into the system;
b) if data point $X_m$ is an outlier, and if (0.05>$H_j$>0.03 and $G_j$<4 months) or if (0.05>$H_j$>0.03 and $t_j$>16 hours), then generate an alert/notification to person $P_j$ requesting them to confirm whether the data point $X_m$ is correct;
c) if data point $X_m$ is an outlier, and ($H_j$>0.05 or $H_j$=0.05), then generate an alert/notification to person $P_j$ requesting them to confirm whether the data point $X_m$ is correct; and
d) otherwise, accept data point $X_m$ into the system.

If the result of applying steps a)-d) is that a data entry has been modified/corrected, then the system updates the previously entered incorrect data with the corrected one(s), and repeats certain of the steps described with regards to identifying a data outlier; this includes recalculating $Q_1$, $Q_3$ and IQR, recalculating values for the upper fence and low fence values in the formula, and then re-training the decision-tree algorithm with potentially updated inputs (such as whether data point $X_j$ is an outlier or not; $H_j$; $G_j$; $t_j$; and whether the data point was a correct one or an erroneous one), and then applying the re-trained decision-tree algorithm to new data entries $X_k$.

Machine Learning Based Methods

Machine learning algorithms and methods are another approach or set of techniques that may be used in order to identify potentially incorrect data. In some cases these techniques may be used to find what might otherwise be "hidden" patterns in, or contributing factors to, the incorrect data. For example, the inventive system may use an unsupervised learning method, such as a clustering algorithm, to identify different categories/groups of data which tend to be associated with each other and may represent different patterns. Using this technique, each cluster may be characterized by a centroid representing the "average" data point corresponding to all data points which are members of that cluster. The system may identify/detect N different clusters with a calculated centroid for each cluster and a maximal abstract distance of all data points of each cluster from their respective centroid. This permits characterizing each set of points that form a cluster by a smaller set of parameters.

Assume that the system identifies a new data point being entered into the system/server/cloud, and calculates a "distance" from it to all previously observed clusters. This enables the system to identify the closest cluster to which that data point should belong. If that distance (from the new data point to the centroid of its assumed cluster) is higher than a predetermined or pre-set percentile (e.g., the 95th or 99th percentile) of the previously calculated/observed distances from the centroid of that cluster to the other data points belonging to that cluster, then the system would flag the newly entered data point as possibly being an incorrect one and generate an alert/notification to the person $P_j$ to request confirmation as to whether the new data point is correct.

In greater detail, such a process may include the following steps or operations:

a) Choose a number K of clusters to use. Determine all K clusters consisting of the data points in the format of corresponding numerical vector entries, as described previously. Calculate a corresponding centroid for each of the K clusters;

b) Calculate the 95th and 99th percentiles for each cluster of all distances from members of each cluster to its respective centroid;
c) Identify the person $P_j$ who entered specific data into the system. Obtain a value for $H_j$, the proportion of previously entered incorrect data entries by the person $P_j$;
d) Identify the cluster to which that specific data item presumably belongs;
e) Calculate the distance d from that data item to the centroid of the cluster it is assumed to belong to;
f) If d 99th percentile of the distances from other members of that cluster to its centroid, then generate an alert/notification to person $P_j$ to request that they provide confirmation that the entered data item is correct;
g) If d 95th percentile of the distances from other members of that cluster to its centroid, then allow the data item to be entered (or re-entered) into the system;
h) If 95th percentile of the distances from other members of that cluster to its centroid<d<99th percentile of the distances from other members of that cluster to its centroid, and $H_j$>0.02, then generate an alert/notification to the person $P_j$ to request that they provide confirmation that the data entry is correct; and
i) If 95th percentile of the distances from other members of that cluster to its centroid<d<99th percentile of the distances from other members of that cluster to its centroid, and $H_j \le 0.02$, then allow the data item to be entered (or re-entered) into the system.

If the result of steps a)-i) is that data has been modified/corrected, then the system updates the incorrect data with the corrected data, and repeats the steps described above (as needed) for the new and historical data points.

Supervised Machine Learning Based Methods

In some embodiments, the inventive system may also use a supervised machine learning technique or method. In this approach, the inventive system and method uses a set of inputs having known values, such as a sufficiently large and reliable set of training data (e.g., a sample of data entries which was annotated or marked as "correct" entries and "incorrect" entries). This sample set could be generated, for example, by manually checking/verifying whether a set of entered data is "correct" or "incorrect". This methodology may be modified if desired to reduce reliance on manual data verification and/or to increase the size of the data used for algorithm training.

For example, the system could select a set of data that was saved in the database and which were captured/entered into the platform during a specific time period, for example, no later than 2 years ago and also no earlier than 1 year ago. This provides the system with all data entered during a 1-year period starting one year in the past and extending to two years in the past (note that this selection may amount to a large number of data items or points, for example 100000 data points). Denote this data set as $DS_1$. Next, the system accesses historical data logs to identify any data changes that occurred for a data point from $DS_1$ from the time the data was entered, up to the current time. With this approach any data point from $DS_1$ would have at least a 1-year time period (and up to 2 years) to have been corrected by a user/administrator in a situation in which the data point was incorrect.

After the process determines the data points from $DS_1$ that had been corrected, it creates a new data set $DS_2$, which will include the incorrect values associated with corrected data points and marks/flags that data as "incorrect". In addition, the process adds the corrected values of the corrected data points to $DS_2$ and marks/flags that data as "correct". Further, the process adds all other data points from $DS_1$ to $DS_2$ which have never been corrected by a user/administrator, and marks/flags that data being "correct", since there is no indication that those data points were incorrect ones (based on the observation that at least one year has passed, and they have not been corrected). Next, the set $DS_2$ is used to train and evaluate the performance of a machine learning/statistical algorithm or other data processing method being considered. For this evaluation, denote I to be a "correctness index" for each data entry in the sample, and annotate/mark "incorrect" entries by making I=1, and "correct" entries with I=0.

Each data entry in the sample is represented in the format of a corresponding numerical vector entry, as was described previously. For example, consider the same data fields described with reference to the previous Table. In that case, the system would maintain a set of information similar to the following relationships between the data entry vectors and the "correctness index" variable 1 (as shown in the Table below, which illustrates a number of rows from a sample data table):

| Corresponding numerical vector entries | Index I |
| --- | --- |
| (13.1, 24, 1, 0, 0) | 0 |
| (58.8, 85, 0, 0, 1) | 0 |
| (1.5, 54, 1, 0, 0) | 1 |
| (125, 236, 0, 1, 0) | 0 |
| (95.4, 12, 0, 0, 1) | 1 |

Next, denote by $H_j$ a proportion of previously entered incorrect data entries by a person $P_j$. If desired, the system may use historical information G about the tenure in a current role of the user/person P entering the data into the system. As an example, denote $G_j$ as the total tenure, measured in months, within the organization/company of the user/person $P_j$ entering the data into the system. As another possible function or operational aspect, the system may use the data about the time of day that the information was entered into the system. As an example, denote $t_j$ as the time of day, measured in hours, when the data/information was entered by the person $P_j$. For example, each record from the above Table could be appended with corresponding values of one or more of $H_j$, G and $t_j$ associated with a person $P_j$ (where different values of j correspond to different data entry persons) entering specific data. Below is an example of a Table with data entries including values of $H_j$, $G_j$ and $t_j$ corresponding to data entries from the previous Table.

| Data entries capturing values of $H_j$, $G_j$, and $t_j$ corresponding to data entries from previous Table | Index I |
| --- | --- |
| (0.01, 18, 11) | 0 |
| (0.005, 25, 13) | 0 |
| (0.03, 3, 18) | 1 |
| (0, 20, 15) | 0 |
| (0.025, 4, 17) | 1 |

Next, the process appends data from the two Tables to form the Table below:

| Corresponding numerical vector entries + data entries capturing values of $H_j$, $G_j$ and $t_j$ | Index I |
| --- | --- |
| (13.1, 24, 1, 0, 0, 0.01, 18, 11) | 0 |
| (58.8, 85, 0, 0, 1, 0.005, 25, 13) | 0 |

-continued

| Corresponding numerical vector entries + data entries capturing values of $H_j$, $G_j$ and $t_j$ | Index I |
|---|---|
| (1.5, 54, 1, 0, 0, 0.03, 3,18) | 1 |
| (125, 236, 0, 1, 0, 0, 20, 15) | 0 |
| (95.4, 12, 0, 0, 1, 0.025, 4, 17) | 1 |

Next, the inventive system and methods uses a suitable analysis technique to evaluate the data; this may include use of one or more of a neural network, random forest algorithm, or logistic regression algorithm, for example, as a candidate algorithm for purposes of a supervised machine learning task. The machine learning task operates to generate a suitable "model" that uses the numerical vector data entries from the first column of the above Table as inputs, and the values in the Index I column in the Table as outputs. This arrangement operates to train the selected candidate algorithm(s) based on the presumably correct set of training data.

Note that it may be desirable to split the initial sample dataset into two portions, and use one portion of the dataset to train the candidate algorithms, and the other portion of the dataset to validate the performance or prediction accuracy of the candidate algorithm(s). Based on the validation results, the system is then able to select the best performing algorithm, along with its appropriately "tuned" initial parameters (the combination of which forms at least a partially validated model for how the given inputs led to the production of the known output).

Next, the selected algorithm/model is used to generate a prediction using a numerical vector entry (either a previous or current one) which was not initially selected to be part of the sample dataset that was used for training and validation of the candidate algorithm(s). In this example, the system will make a "prediction" in the form of a probability value of whether Index I=1 (corresponding to an "incorrect" entry) for each specific data entry.

Using this methodology, in one implementation the following logic may be used:
a) Identify the person $P_j$ who entered specific data into the system. Obtain $H_j$, a measure or proportion of the previously entered incorrect data entries by the person $P_j$; obtain $G_j$, a total tenure of the person $P_j$ (e.g., measured in months) within the organization/company; obtain $t_j$, a time of the day (e.g., measured in hours) when the information was added to the system by the person $P_j$;
b) Estimate a probability value p of the entered data being incorrect by using the selected/validated machine learning technique/algorithm as applied to the data entry;
c) If p≥0.1, then generate an alert/notification to person $P_j$ to request that they confirm whether the entered data is correct (and if not, to enter corrected data); and
d) If p<0.1, then allow the entered data to be accepted by the system (accept and store entered data).

Note that if the result of steps a)-d) is that feedback from at least one person $P_j$ is received (regardless of whether the feedback was a data correction, or confirmation that an initial entry was correct), then the system operates to add a data entry corresponding to the feedback received, along with the confirmed value of the Index I (i.e., whether data entries were correct or not) to the initial sample dataset. Next, the system may repeat the steps described as part of a Supervised Machine Learning approach by retraining and re-validating the performance of the candidate machine learning algorithm in order to select the optimal/"best" performing one (which may differ from that previously selected, or which may have differences in certain of the "tuned" parameters).

The following represent some of the aspects and benefits of the operation and functions of the inventive system and methods:
  Real-time alerts may be generated and presented to the person entering data, or having recently finished entering the data. This differs from conventional auto-correction or auto-complete processes, in that the invention may utilize a machine-human interaction as a source for data correction;
  Embodiments of the invention may include a feedback loop that includes a user receiving an alert/notification regarding data that may be incorrect, followed by a response from the user. In either case (i.e., when the person receives the alert and corrects data, or confirms that newly entered data was correct), the machine learning/statistics algorithms are dynamically adjusted and re-trained, with an expected improvement over time based on observing responses/actions from people receiving alerts;
  Note that this likelihood (of an error by a specific person in entering data values) could be a function of the time that a person has been tasked with entering data into the system/server/cloud/platform. For example, the system might observe that people tend to make more mistakes when they are newer to a particular role or have less familiarity with certain types or formats of data. Or, that data entry mistakes are more common after a certain amount of time spent entering data during a day, week, etc.; and
  The system may use different algorithms/techniques for pattern or trend recognition depending on the type of data being evaluated for accuracy. For example, the system might use clustering based algorithms for CRM data, while using outlier detection algorithms for ERP data entered into the system (where the selection is based on characteristics of the data format or values, and may be guided by the evaluation of information regarding the historical accuracy for entering data of that type to determine the "best" or optimal data processing method or algorithm, etc.).

In some embodiments or implementations, the following possible variations, extensions, or modifications to the operation of the inventive system and methods may be utilized:
  the characteristics of the data being entered and/or evaluated after previous entry may impact the most effective or useful analysis method(s) for determining incorrect data—
    although in some cases the application from which the data is derived (e.g., CRM, ERP, eCommerce, HR, financial) may be used to determine the most suitable technique or analysis tool for determining incorrect data, examination or evaluation of the data itself may be needed to determine which algorithm or methodology is most applicable. For example, one could select a training sample of 1000 records from one or more data processing applications (e.g., CRM, ERP, eCommerce etc.). The selected data would be subjected to a manual verification process (by asking the people who entered those records to carefully review their previous entries and mark any incorrect ones) to clarify which data records were correct ones, and which were not correct for each training data sample. Then the system could apply one or more different algorithms, heuristics, or techniques (such as machine learning) in order to identify the best performing detection algorithms for each specific data sample, and its corresponding application (CRM, ERP, eCommerce etc.). Based on that information, the system would use the "best" performing algorithm for each specific application, where as discussed previously, in order to select the "best" or optimal algorithm/method reference may be made to a suitable algorithm/method performance metric;

the characteristics of a user, an account, a type of data, a business data processing application, etc., may be used to alter or set a limit, threshold or other aspect of a technique used to identify incorrect data— generally, any characteristic associated, correlated, or otherwise linked to the accuracy of previously entered data may be used. For example, the proportion of incorrect entries in the past for a specific user (or account) may be used to set a rule or constraint for newly entered data. In this approach, the higher the likelihood of incorrect data entry being associated with a specific user, account, data type, or business data processing application, the more restrictive the thresholds or limits that would be selected for the model in order to be able to accept the data entry. Similarly, the lower the likelihood of incorrect data entry associated with a specific user, account, data type, or business data processing application, the less restrictive the thresholds or limits selected would be in order for the model to accept the data entry. Note that specific values of thresholds could be selected empirically by testing and optimizing them using training data samples, as described previously, in order to increase the accuracy of the detection of incorrect data in the training data samples for each application;

the integration of the inventive methods with the operation of a data processing system— note that embodiments of the inventive system and methods enable real-time or pseudo real-time identification of potentially incorrect data, where that data may be in the process of being entered by a user or has just been entered (but not yet accepted, processed, or stored on the system); the inventive system can generate an alert to the user/account that a potential data error exists and the data can be verified or corrected before it is more widely used by others or relied upon;

if desired, raw and aggregated data values resident in a database of a multi-tenant platform and associated with multiple users or multiple accounts may be used to assist in determining if an element of data is correct or incorrect— this larger set of data may be used to obtain better performance from the inventive methods used for the detection of incorrect data and/or the selection of appropriate limits or error thresholds. The larger data set available from multiple users and/or accounts may be used to provide a larger set of training data for the algorithms, heuristics, or machine learning techniques used to detect potentially incorrect data. In addition, by examining trends in data entry errors among multiple users and/or accounts, the inventive methods may be able to increase the confidence level in the outcome of the error detection method being applied. The larger and perhaps more varied data set may also be used to provide insight into the performance of a typical data entry person when entering a specific type of data, and this information may also be used in determining the appropriate limits or thresholds for acceptable data (particularly in situations where the data entry user/account being considered lacks sufficient historical data to be able to confidently set a threshold or limit); and In some cases, the values of certain business related data stored in a database may be useful in determining a threshold or limit to be used in determining whether a specific data item is correct or incorrect—for example, if analysis or modeling determines that when the number or velocity of certain transactions reaches a certain level, then the accuracy of data entry changes, the threshold or limit may be made a dynamic quantity that varies in accordance with the value of one or more business metrics or other aspects of the underlying data.

Figure 5:
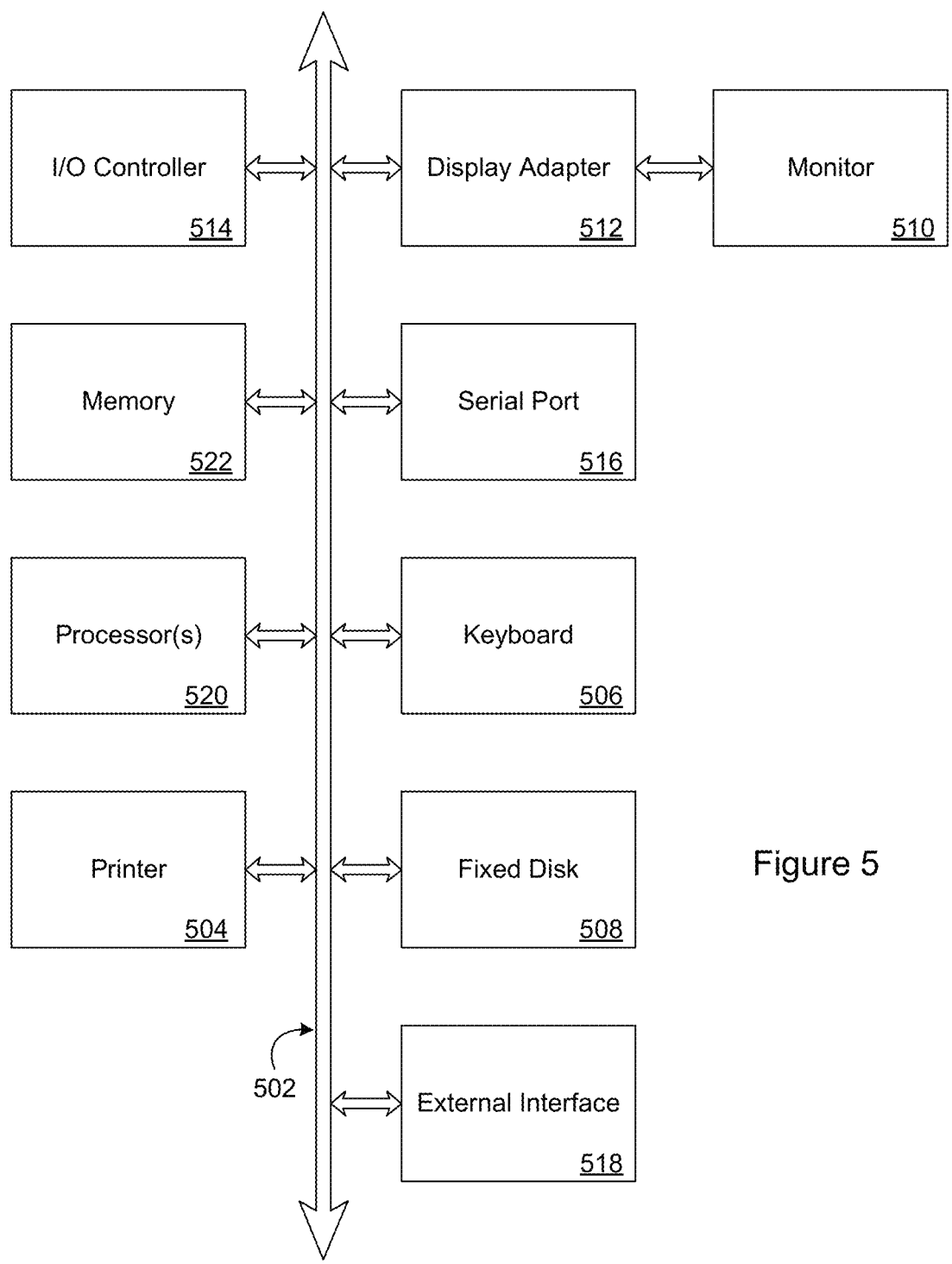
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for enabling automated detection of incorrect data may be wholly or partially implemented in the form of a set of instructions executed by one or more programmed computer processors such as a central processing unit (CPU) or microprocessor. Such processors may be incorporated in an apparatus, server, client, or other computing or data processing device or platform operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for detecting and correcting incorrect data being entered into a computer system, comprising:
   receiving, by the computer system via a user interface, data entered by a user;
   determining a category or type of the data entered into the computer system by the user;
   selecting, by the computer system, based on the determined category or type of data, one data analysis technique from a plurality of defined data analysis techniques that are each configured for evaluating the data entered to determine if the data entered is correct or incorrect;
   wherein each of the plurality of defined data analysis techniques includes an accuracy metric associated with the determined category or type of data, wherein the accuracy metric indicates an accuracy performance for identifying incorrect data for the determined category or type of data, and wherein the one data analysis technique is selected as having a highest accuracy metric from among the plurality of defined data analysis techniques associated with the determined category or type of data;
   accessing historical information regarding data entry accuracy of the user that inputted the data entered, wherein the historical information includes a proportion of previously incorrect data entries by the user that is indicative of the user's accuracy with regards to data entry for the category or type of data entered;
   applying the selected one data analysis technique on the data entered by the user to identify likely errors;
   determining, by the computer system based on the selected one data analysis technique and the historical information of the data entry accuracy for the user, the likelihood that the data entered is incorrect;
   determining that the data entered is incorrect using the determined likelihood that the data entered is incorrect to decide whether the data should be accepted into the computer system based on comparing the likelihood to one or more limits, rules, conditions, triggers, or threshold values;
   storing the data within the computer system if a result of the comparison indicates that the data should be accepted into the computer system;
   generating an alert message and transmitting the alert message to a device associated with the user if the result of the comparison indicates that the data should not be accepted into the computer system, wherein the alert message includes instructions requesting that the user review the data and determine whether the data is correct or incorrect, and if the data is incorrect, to provide a correction to the data; and
   receiving, by the computer system, a response from the user, and either accepting the data into the computer system, or accepting a revised or corrected version of the data into the computer system based on the response.

2. The method of claim 1, wherein the category or type of data includes one of ERP, CRM, eCommerce, or financial data.

3. The method of claim 1, wherein determining the category or type of data is performed by means of a user input or detection of a characteristic of the data entered.

4. The method of claim 1, wherein selecting the one data analysis technique for use in evaluating the data entered further comprises selecting one of the plurality of defined data analysis techniques from a group of techniques comprising statistical analysis, data outlier identification, pattern identification, or application of a machine learning technique;
   wherein the limits, rules, conditions, triggers, or threshold values are defined based on the user, an account associated with the user, the user's historical data entry accuracy information, or business data associated with the account;
   wherein the business data associated with the account may include one or more of ERP, CRM, eCommerce, HR, or financial data; and
   wherein generating the alert message and transmitting the alert message to the device is performed in real-time while the user is entering the data into the computer system;
   wherein the method further comprises retraining the computer system for automatically selecting an appropriate data analysis technique by including the correction to the data and removing the incorrect data from a training data set.

5. A multi-tenant data processing system, comprising:
at least one computer system configured to provide network access to the computer system to a plurality of tenants;
one or more business related data processing applications installed in the at least one computer system and accessible by a plurality of tenants of the multi-tenant data processing system;
a data storage device accessible by the plurality of tenants of the multi-tenant data processing system;
a processor programmed with a set of instructions stored on a non-transitory computer readable medium, wherein when executed by the processor, the instructions cause the processor to
receive, by the computer system via a user interface, data entered by a user;
determine a category or type of data entered into the system by a user;
select, by the computer system, based on the determined category or type of data, one data analysis technique from a plurality of defined data analysis techniques that are each configured for evaluating the data entered to determine if the data entered is correct or incorrect;
wherein each of the plurality of defined data analysis techniques includes an accuracy metric associated with the determined category or type of data, wherein the accuracy metric indicates an accuracy performance for identifying incorrect data for the determined category or type of data, and wherein the one data analysis technique is selected as having a highest accuracy metric from among the plurality of defined data analysis techniques associated with the determined category or type of data;
access historical information regarding the data entry accuracy of the user that inputted the data entered, wherein the historical information includes a proportion of previously incorrect data entries by the user that is indicative of the user's accuracy with regards to data entry for the category or type of data entered;
apply the selected one data analysis technique on the data entered by the user to identify likely errors;
determine, by the computer system based on the selected data analysis technique and the historical information for the user, the likelihood that the data entered is incorrect;
determine that the data entered is incorrect by using the determined likelihood that the data entered is incorrect to decide whether the data should be accepted into the computer system based on comparing the likelihood to one or more limits, rules, conditions, triggers, or threshold values;
store the data within the computer system if a result of the comparison indicates that the data should be accepted into the computer system;
generate an alert message and transmit the alert message to a device associated with the user if the result of the comparison indicates that the data should not be accepted into the computer system, wherein the alert message includes instructions requesting that the user review the data and determine whether the data is correct or incorrect, and if the data is incorrect, to provide a correction to the data; and
receive, by the computer system, a response from the user, and either accept the data into the computer system, or accept a revised or corrected version of the data into the computer system.

6. The multi-tenant data processing system of claim 5, wherein the business related data processing applications installed in the computer system include one or more of an enterprise resource planning (ERP), customer relationship management (CRM) or eCommerce application.

7. The multi-tenant data processing system of claim 5, wherein the category or type of data includes one of ERP, CRM, eCommerce, or financial data.

8. The multi-tenant data processing system of claim 5, wherein determining the category or type of data is performed by means of a user input or detection of a characteristic of the data being entered.

9. The multi-tenant data processing system of claim 5, wherein selecting the one data analysis technique for use in evaluating the data entered further comprises selecting one of the plurality of defined data analysis techniques which comprises statistical analysis, data outlier identification, pattern identification, or application of a machine learning technique.

10. The multi-tenant data processing system of claim 5, wherein the limits, rules, conditions, triggers, or threshold values are defined based on the user, an account associated with the user, the user's historical data entry accuracy information, or business data associated with the account.

11. The multi-tenant data processing system of claim 10, wherein the business data associated with the account may include one or more of ERP, CRM, eCommerce, HR, or financial data.

12. The multi-tenant data processing system of claim 11, wherein the limits, rules, conditions, triggers, or threshold values depend upon real-time or pseudo real-time values of the business data that is associated with the account.

13. The multi-tenant data processing system of claim 10, wherein the limits, rules, conditions, triggers, or threshold values a role of the user.

14. The multi-tenant data processing system of claim 5, wherein the processor is further configured to retrain the process for selecting the data analysis technique by including the revised or corrected data and removing the incorrect data from a training data set.

15. The multi-tenant data processing system of claim 5, wherein the alert message includes a notification and is generated in real-time during a data entry session being performed by the user while the user is entering the data into the system.

16. The multi-tenant data processing system of claim 5, wherein the alert message is generated after a data entry session being performed by the user.

* * * * *